(12) United States Patent
Gutmann

(10) Patent No.: US 12,291,200 B2
(45) Date of Patent: *May 6, 2025

(54) USING WHEEL ORIENTATION TO DETERMINE FUTURE HEADING

(71) Applicant: Waymo LLC, Mountain View, CA (US)

(72) Inventor: Jens-Steffen Ralf Gutmann, Cupertino, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,790

(22) Filed: Nov. 16, 2023

(65) Prior Publication Data
US 2024/0083425 A1 Mar. 14, 2024

Related U.S. Application Data

(63) Continuation of application No. 17/689,451, filed on Mar. 8, 2022, now Pat. No. 11,851,055, which is a
(Continued)

(51) Int. Cl.
*B60W 30/095* (2012.01)
*B60W 10/04* (2006.01)
(Continued)

(52) U.S. Cl.
CPC ........ *B60W 30/0956* (2013.01); *B60W 10/04* (2013.01); *B60W 10/20* (2013.01);
(Continued)

(58) Field of Classification Search
CPC .. B60W 30/0956; B60W 10/04; B60W 10/20; B60W 40/04; B60W 40/105;
(Continued)

(56) References Cited

U.S. PATENT DOCUMENTS

| 8,155,879 B2 | 4/2012 | Takagi et al. |
| 8,289,321 B2 | 10/2012 | Gutmann et al. |

(Continued)

FOREIGN PATENT DOCUMENTS

| CN | 101443752 A | 5/2009 |
| CN | 103155014 A | 6/2013 |

(Continued)

OTHER PUBLICATIONS

Australian Full Examination Report for Application No. 2018219084 dated Sep. 23, 2019.
(Continued)

*Primary Examiner* — Russell Frejd
(74) *Attorney, Agent, or Firm* — Botos Churchill IP Law LLP

(57) ABSTRACT

The technology relates to determining a future heading of an object. In order to do so, sensor data, including information identifying a bounding box representing an object in a vehicle's environment and locations of sensor data points corresponding to the object, may be received. Based on dimensions of the bounding box, an area corresponding to a wheel of the object may be identified. An orientation of the wheel may then be estimated based on the sensor data points having locations within the area. The estimation may then be used to determine a future heading of the object.

20 Claims, 11 Drawing Sheets

Related U.S. Application Data continuation of application No. 16/790,818, filed on Feb. 14, 2020, now Pat. No. 11,299,150, which is a continuation of application No. 16/406,175, filed on May 8, 2019, now Pat. No. 10,611,373, which is a continuation of application No. 16/050,964, filed on Jul. 31, 2018, now Pat. No. 10,336,325, which is a continuation of application No. 15/429,275, filed on Feb. 10, 2017, now Pat. No. 10,077,047.

(51) Int. Cl.
| | | |
|---|---|---|
| *B60W 10/20* | (2006.01) | |
| *B60W 40/04* | (2006.01) | |
| *B60W 50/00* | (2006.01) | |
| *B60W 50/14* | (2020.01) | |
| *G01S 13/931* | (2020.01) | |
| *G01S 15/931* | (2020.01) | |
| *G01S 17/931* | (2020.01) | |
| *G06V 10/25* | (2022.01) | |
| *G06V 20/58* | (2022.01) | |
| *G08G 1/16* | (2006.01) | |

(52) U.S. Cl.
CPC ........ *B60W 40/04* (2013.01); *B60W 50/0097* (2013.01); *B60W 50/14* (2013.01); *G01S 13/931* (2013.01); *G01S 15/931* (2013.01); *G01S 17/931* (2020.01); *G06V 10/25* (2022.01); *G06V 20/58* (2022.01); *G08G 1/166* (2013.01); *B60W 2420/403* (2013.01); *B60W 2420/408* (2024.01)

(58) Field of Classification Search
CPC ............. B60W 50/0097; B60W 50/14; B60W 2420/403; B60W 2420/408; B60W 30/095; B60W 30/14; B60W 60/001; B60W 2050/0005; B60W 2050/146; B60W 2520/10; B60W 2554/40; G01S 13/931; G01S 15/931; G01S 17/931; G06V 10/25; G06V 20/58; G08G 1/166; G01D 21/02; G06F 16/29; G06N 20/00
See application file for complete search history.

(56) References Cited

U.S. PATENT DOCUMENTS

| | | | |
|---|---|---|---|
| 8,736,463 | B1 | 5/2014 | Zhu et al. |
| 9,244,462 | B2 | 1/2016 | Pedersen |
| 9,248,834 | B1 | 2/2016 | Ferguson et al. |
| 9,483,059 | B2 | 11/2016 | Caveney |
| 9,495,602 | B2 | 11/2016 | Okumura |
| 9,669,827 | B1 | 6/2017 | Ferguson et al. |
| 9,802,568 | B1 | 10/2017 | Larner |
| 9,817,397 | B1 | 11/2017 | Larner et al. |
| 9,849,852 | B1 | 12/2017 | Larner et al. |
| 10,077,047 | B2 | 9/2018 | Gutmann |
| 2015/0210216 | A1 | 7/2015 | Reichel et al. |
| 2016/0059855 | A1 | 3/2016 | Rebhan et al. |
| 2016/0098496 | A1 | 4/2016 | Joshi et al. |
| 2016/0291145 | A1 | 10/2016 | Zeng et al. |
| 2016/0358476 | A1 | 12/2016 | Aso et al. |
| 2016/0379486 | A1 | 12/2016 | Taylor |
| 2017/0158175 | A1 | 6/2017 | Fairfield |

FOREIGN PATENT DOCUMENTS

| | | | |
|---|---|---|---|
| CN | 104094177 | A | 10/2014 |
| CN | 105073542 | A | 11/2015 |
| CN | 106054191 | A | 10/2016 |
| EP | 2626847 | A1 | 8/2013 |
| JP | 20000099686 | A | 4/2000 |
| JP | 2004227293 | A | 8/2004 |
| JP | 2006160194 | A | 6/2006 |
| JP | 2007001405 | A | 1/2007 |
| JP | 2007140938 | A | 6/2007 |
| JP | 2009096361 | A | 5/2009 |
| JP | 2013166398 | A | 8/2013 |
| JP | 2015082326 | A | 4/2015 |
| JP | 2016180654 | A | 10/2016 |
| WO | 2015197237 | A1 | 12/2015 |

OTHER PUBLICATIONS

Chinese Office Action for Application No. CN201880011176.3 dated Feb. 5, 2020.
International Search Report and Written Opinion for Application No. PCT/US2018/016133 dated Apr. 23, 2018.
Japanese Notice of Allowance for Application No. JP2019-539766 dated Feb. 12, 2020.
Japanese Office Action for Application No. JP2020-036216 dated Apr. 28, 2021.
Notice of Allowance for CN Patent Application No. 201880011176.3, dated Apr. 2, 2020 4 pages, with English Translation.
Notice of Allowance for KR Patent Application No. 10-2019-7023650, dated May 6, 2020 No English Translation 2 pages.
Republic of Korea Notice of Final Rejection for Application No. 10-2019-7023650 mailed Mar. 23, 2020.
Singapore Search Report and Written Opinion for Application No. 11201906693U dated Jan. 20, 2020.
The First Office Action for Chinese Patent Application No. 202010429065.3, Dec. 20, 2022.
Translation of Chinese Office Action issued in Corresponding CN Application No. 201880011176.3 dated Feb. 5, 2020.
"International Search Report and Written Opinion for International Application No. PCT/US2018/016133 dated Apr. 23, 2018", 17 pages.
Zia, et al., "Detailed 3D Representations for Object Recognition and Modeling", Google Scholar, IEEE Transactions on Pattern Analysis and Machine Intelligence, vol. 35, No. 11, Nov. 2013, pp. 2608-2623. (Year: 2013).

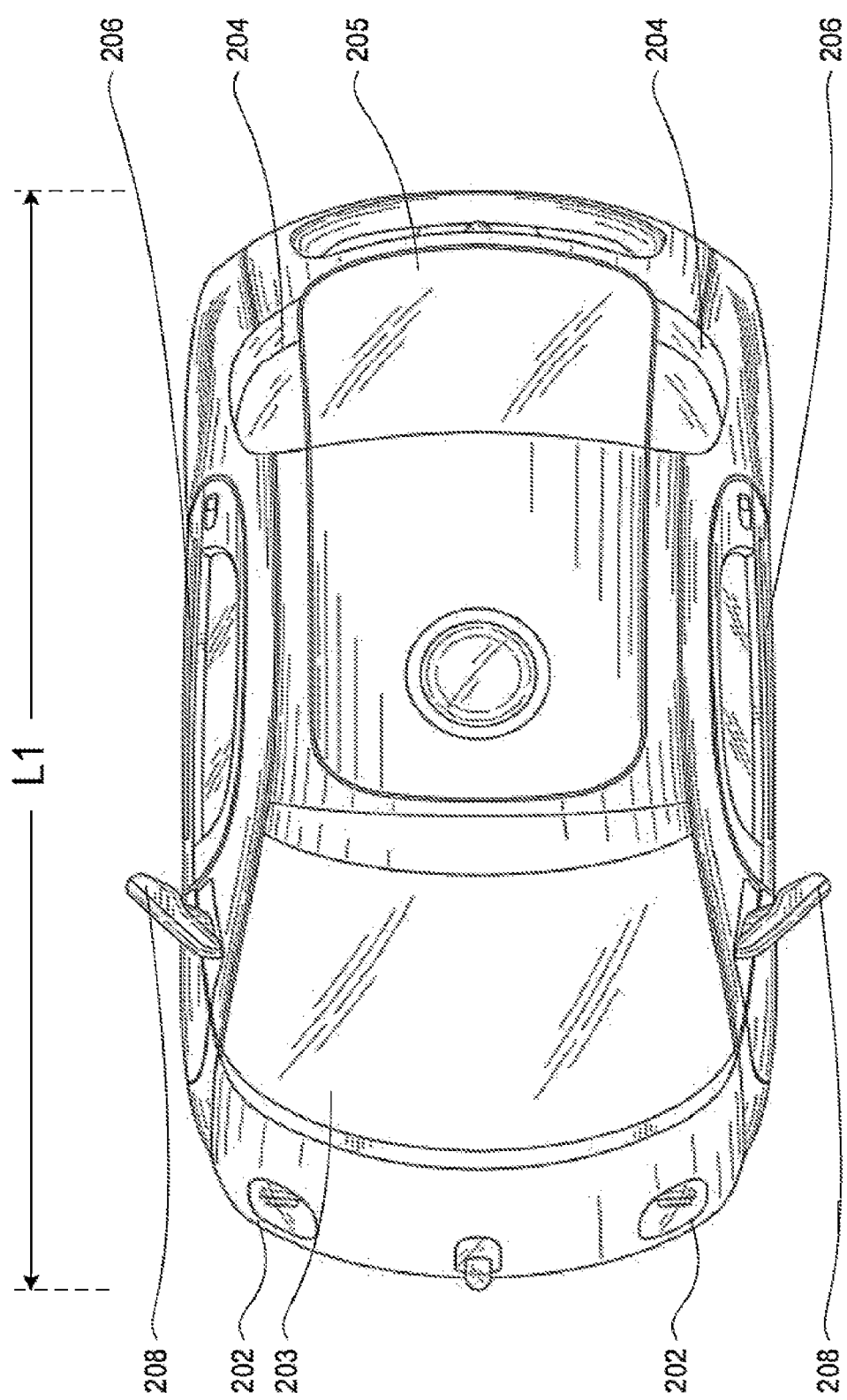

400

USING WHEEL ORIENTATION TO DETERMINE FUTURE HEADING

CROSS-REFERENCE TO RELATED APPLICATIONS

The present application is a continuation of U.S. patent application Ser. No. 17/689,451, filed Mar. 8, 2022, now issued as U.S. Pat. No. 11,851,055, which is a continuation of U.S. patent application Ser. No. 16/790,818, filed Feb. 14, 2020, now issued as U.S. Pat. No. 11,299,150 on Mar. 23, 2022, which is a continuation of U.S. patent application Ser. No. 16/406,175, filed May 8, 2019, now issued as U.S. Pat. No. 10,611,373 on Apr. 7, 2020, which is a continuation of U.S. patent application Ser. No. 16/050,964, filed Jul. 31, 2018, now issued as U.S. Pat. No. 10,336,325 on Jul. 2, 2019, and which is a continuation of U.S. patent application Ser. No. 15/429,275, filed Feb. 10, 2017, now issued as U.S. Pat. No. 10,077,047 on Sep. 18, 2018, the disclosures of which are incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

Such vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.). In many cases, such systems are now able to identify the type of the object, for instance using cues such as the object size, shape, speed, location, etc. These characteristics can be used to predict what an object is likely to do for some brief period into the future which can be used to control the vehicle in order to avoid these objects. Thus, detection, identification, and prediction are critical functions for the safe operation of autonomous vehicle.

BRIEF SUMMARY

Aspects of the disclosure provide a method of determining a future heading of an object. The method includes receiving, by one or more processors, sensor data including information identifying an object in a vehicle's environment and sensor data points corresponding to the object; identifying, by the one or more processors, an area corresponding to an expected location of a wheel of the object based on the sensor data; estimating, by the one or more processors, an orientation of the wheel based on the sensor data points having locations within the area; and determining, by the one or more processors, a future heading of the object based on the estimation.

In one example, estimating the orientation includes fitting any of the sensor data points having locations within the area to a first plane. In this example, the sensor data further includes a bounding box bounding the data points corresponding to the object, and estimating the orientation includes determining an angular difference between a second plane of a side of the bounding box and the first plane. In addition, estimating the orientation of the wheel is further based on sensor data points having locations that are outside of the bounding box and within the area. In another example, identifying the area is further based on a prior estimated trajectory of the object determined over a period of time. In this example, identifying the area is further based on a type of the object. In another example, the method also includes generating a notification based on the future heading and providing the notification to a passenger of the vehicle indicating that the object is moving towards the vehicle. In this example, the notification requests that the passenger take control of one or more of the steering, acceleration, and deceleration of the vehicle. In another example, the method also includes using the future heading to control the vehicle in an autonomous driving mode. In another example, identifying the area is further based on a model of wheel locations. In this example, the sensor data further includes a bounding box bounding the data points corresponding to the object, and identifying the area further includes inputting dimensions of the bounding box into the model. In addition or alternatively, the model is based on a fixed wheel radius. In another example, the method also includes receiving an image of the object and analyzing the image to identify a possible wheel location, and wherein identifying the area is further based on the possible wheel location.

Another aspect of the disclosure provides a system for predicting that an object is going to enter into a trajectory of a vehicle. The system includes one or more processors configured to receive sensor data including information identifying an object in a vehicle's environment and sensor data points corresponding to the object; identify an area corresponding to an expected location of a wheel of the object based on the sensor data; estimate an orientation of the wheel based on the sensor data points having locations within the area; and determine a future heading of the object based on the estimation.

In one example, the one or more processors are further configured to estimate the orientation by fitting any of the sensor data points having locations within the area to a first plane. In another example, the sensor data further includes a bounding box bounding the data points corresponding to the object, and the one or more processors are further configured to estimate the orientation by determining an angular difference between a second plane of a side of the bounding box and the first plane. In another example, the one or more processors are further configured to generate a notification based on the future heading and provide a notification to a passenger of the vehicle indicating that the object is moving towards the vehicle. In another example, the one or more processors are further configured to use the future heading to control the vehicle in an autonomous driving mode. In another example, the system also includes the vehicle.

Another aspect of the disclosure provides a non-transitory computer readable recording medium on which instructions are stored. The instructions when executed by one or more processors, cause the one or more processors to perform a method for predicting that an object is going to enter into a trajectory of a vehicle. The method includes receiving sensor data including information identifying an object in a vehicle's environment and sensor data points corresponding to the object; identifying an area corresponding to an expected location of a wheel of the object based on the sensor data; estimating an orientation of the wheel based on the sensor data points having locations within the area; and determining a future heading of the object based on the estimation.

BRIEF DESCRIPTION OF THE DRAWINGS

FIGS. 2A-2D are example external views of a vehicle in accordance with aspects of the disclosure.

DETAILED DESCRIPTION

Overview

Figure 1:
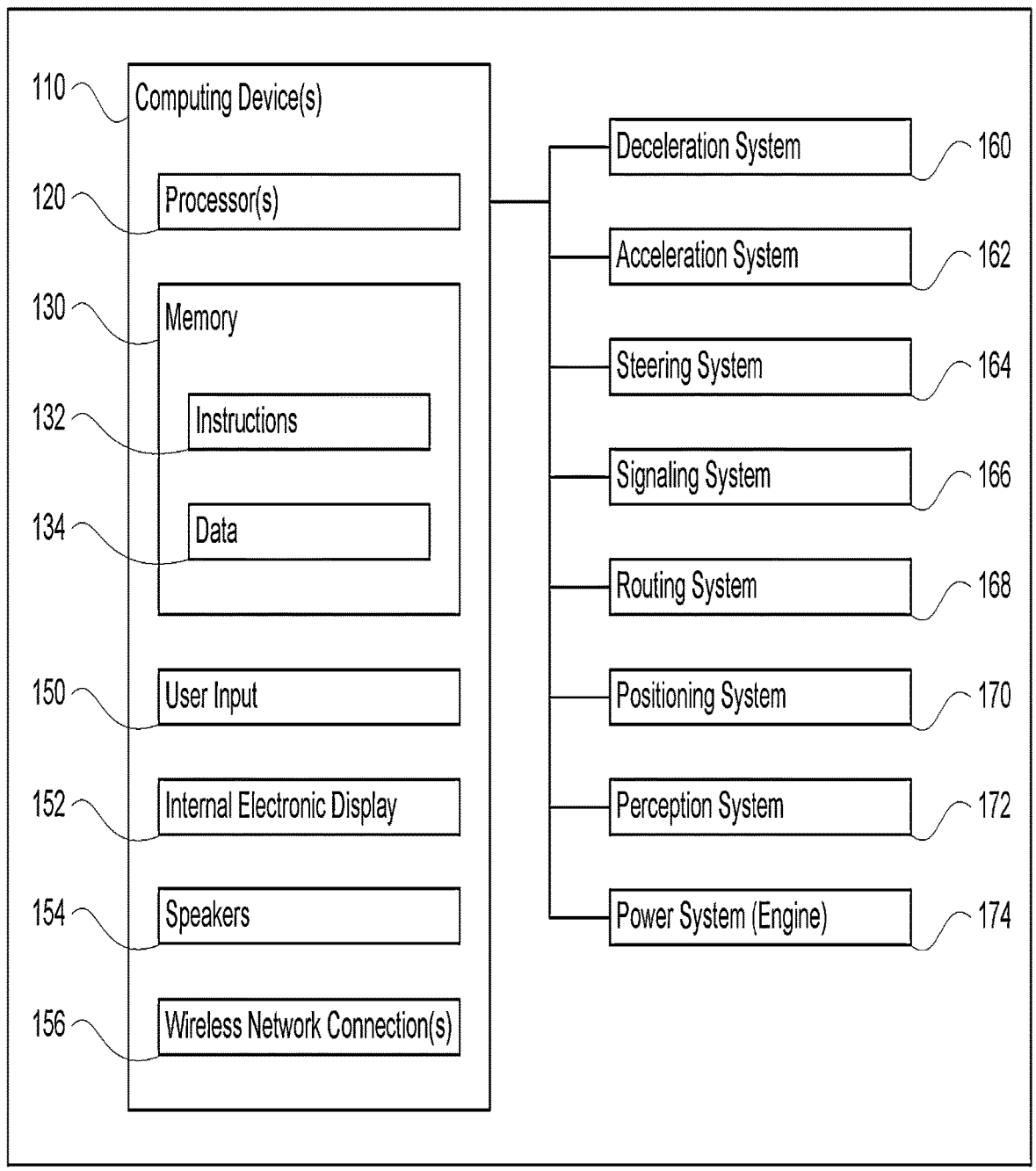
FIG. 1 is a functional diagram of an example vehicle in accordance with aspects of the disclosure.

The technology relates to predicting a future trajectory of an object and using this information to make a driving decision for an autonomous vehicle. For certain types of objects having wheels, such as vehicles or bicycles, the raw sensor information can be used to identify the relative orientation of the object's front wheel including the object's tire, rim (or hubcap), or both. For example, in a passenger car, a tire may be large enough to be detected, but for a bicycle, the tire may be fairly thin and more difficult to detect. This can then be used to determine a future trajectory of the object, for instance, by combining information about the object's past trajectory or speed with the orientation of the wheel.

The perception system and/or the vehicle's computing devices may use prior observations of the object to predict a future trajectory of the object. For instance, an object's speed, orientation/heading, location, state (i.e. turn signal, etc.), prior estimated trajectory, may be used to predict a series of locations and times in the future where the object is likely to be. Together, these locations and times may form a trajectory for the object for some brief period into the future.

The vehicle's perception system may also identify the location of sensor data points corresponding to an object. This information may be provided by segmentation of the sensor data. Segmentation is the process of labeling sensor data such that the computing devices know which sensor data points (or vision pixels) correspond to an object. In some instances, the sensor data may be segmented into bounding boxes which represent estimated dimensions of an object. In addition, the perception system may provide information identifying sensor data points around the object, but not specifically associated with the object by the segmentation. The perception system may also identify and provide characteristics of the object, such as the object's location, orientation, size, shape, type, direction and speed of movement, etc.

Using the size of the bounding box and/or the dimensions of the object, the vehicle's computing devices may estimate an area corresponding to a location of a wheel of the object. In order to estimate location of a wheel (front or rear) of an object, the vehicle's computing system may have access to information identifying expected wheel locations for different vehicle sizes, or in some cases, even vehicle types. Using the example of the front wheel, generally, unless the object is heading towards the vehicle's sensors, only one front wheel will be visible to the sensors, so the location of this front wheel relative to the bounding box can be estimated based on a combination of the heading of the object (for instance, from a past trajectory of the object) and the expected wheel locations (identified using the size of the bounding box and/or dimensions of the object).

The data points within the area may then be analyzed to identify an average orientation of the points in the area. For instance, the data points may be fit to a plane using a simple plane fitting algorithm. The difference between this plane and the plane of the side of the bounding box may be estimated to be an orientation of the vehicle's wheel.

Of course, the number of data points within the area will depend upon the relative positions, distance and angle between the object's front wheel and the vehicle's sensors. In that regard, the closer the object is to the vehicle and the more perpendicular the wheel is to the vehicle's sensors, the more sensor data points are likely to be received from wheel surface and the more accurate the estimation may be.

The estimation may be used as an indication of the curvature of the future path of the object or yaw rate of the object. For example, combining the future wheel orientation with the object's speed, a trajectory of the object can be determined. The predicted heading or trajectory may then be used to make driving decisions for the vehicle.

The features described herein allow a vehicle's computing devices to estimate an orientation of an object's wheels. This may allow the vehicle's computing devices to predict a change in the heading of an object, before the object even begins to make the heading change. By doing so, the vehicle's computing devices can better predict a future path or trajectory of the object and thus make better decisions about how to control the vehicle.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be an autonomous driving computing system incorporated into vehicle 100. The autonomous driving computing system may be capable of communicating with various components of the vehicle. For example, returning to FIG. 1, computing devices 110 may be in communication with various systems of vehicle 100, such as deceleration system 160, acceleration system 162, steering system 164, signaling system 166, routing system 168, positioning system 170, and perception system 172, and power system 174, for instance a gas or diesel powered engine or electric motor, in order to control the movement, speed, etc. of vehicle 100 in accordance with the instructions 132 of memory 130. Again, although these systems are shown as external to computing devices 110, in actuality, these systems may also be incorporated into computing devices 110, again as an autonomous driving computing system for controlling vehicle 100.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Routing system 168 may be used by computing devices 110 in order to determine and follow a route to a location. In this regard, the routing system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways. In addition, this map information may include information regarding traffic controls, such as traffic signal lights, stop signs, yield signs, etc., which, in conjunction with real time information received from the perception system 172, can be used by the computing devices 110 to determine which directions of traffic have the right of way at a given location.

The map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with greater accuracy than absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing devices 110. In the case where the vehicle is a small passenger vehicle such as a car, the car may include a laser or other sensors mounted on the roof or other convenient location. For instance, a vehicle's perception system may use various sensors, such as LIDAR, sonar, radar, cameras, etc. to detect objects and their characteristics such as location, orientation, size, shape, type, direction and speed of movement, etc. The raw data from the sensors and/or the aforementioned characteristics can be quantified or arranged into a descriptive function or vector for processing by the computing devices 110. As discussed in further detail below, computing devices 110 may use the positioning system 170 to determine the vehicle's location and perception system 172 to detect and respond to objects when needed to reach the location safely.

Figure 2A:
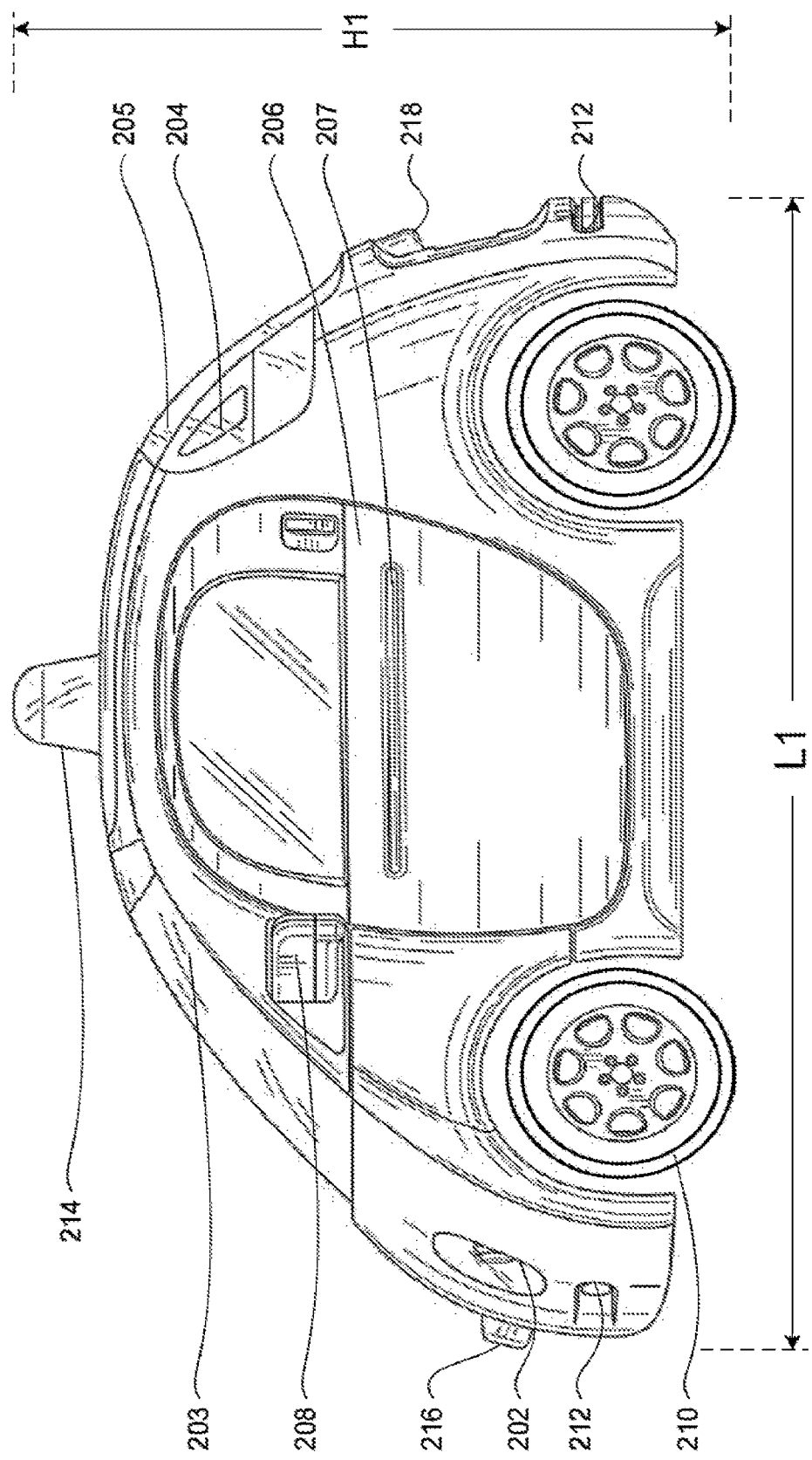
Figure 2C:
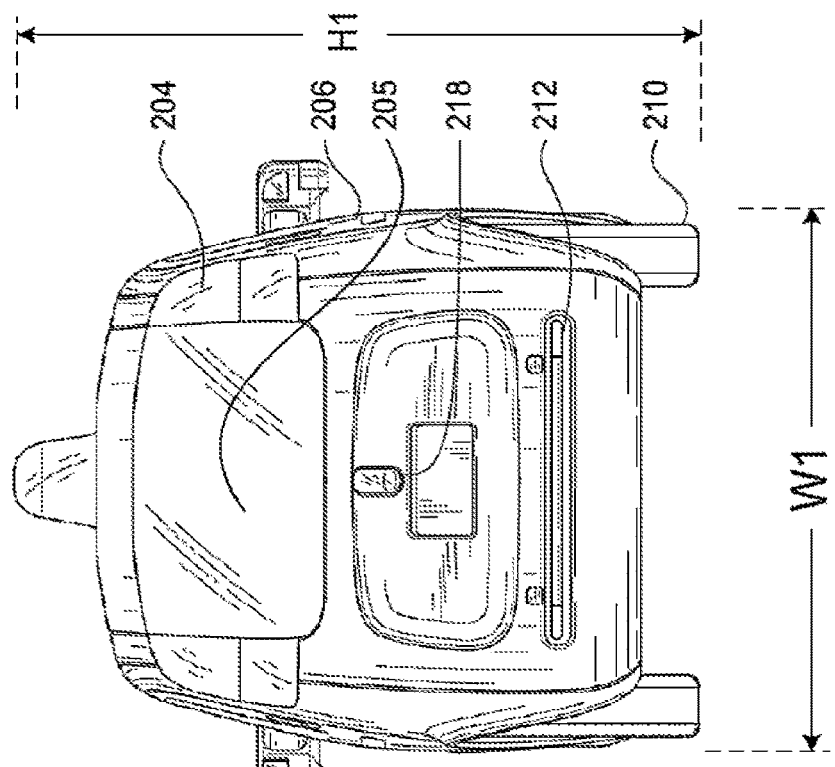
Figure 2B:
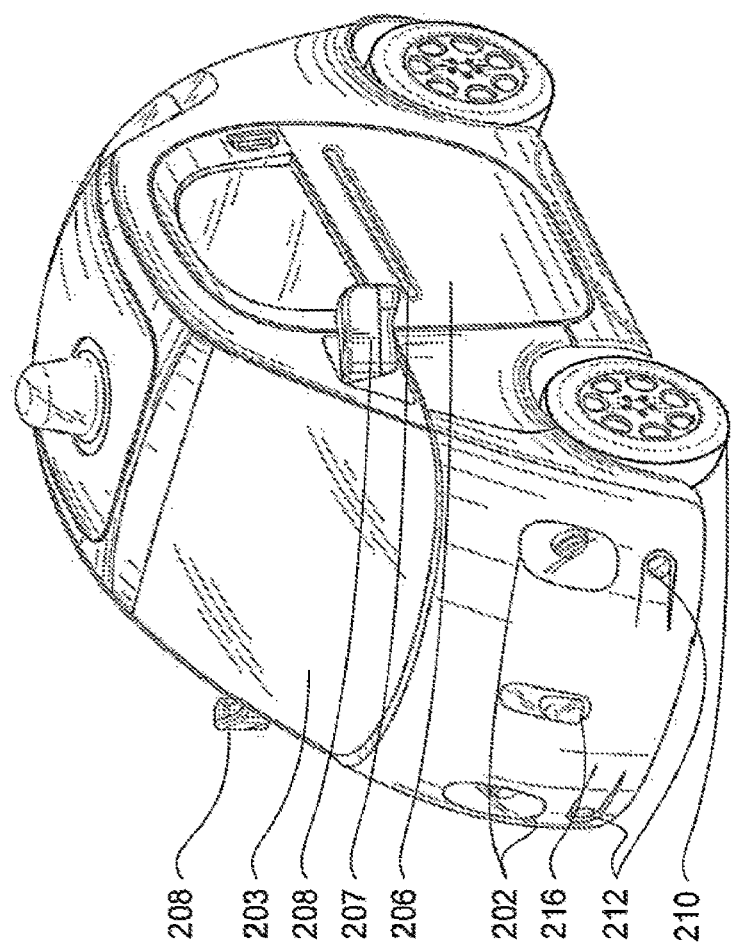

FIGS. 2A-2D are examples of external views of vehicle 100 having a width dimension W1 (as shown in FIG. 2C), a length dimension L1 (as shown in FIGS. 2A and 2D), and a height dimension H1 (as shown in FIGS. 2A and 2C). As can be seen, vehicle 100 includes many features of a typical vehicle such as headlights 202, windshield 203, taillights/turn signal lights 204, rear windshield 205, doors 206, side view mirrors 208, wheels 210, and turn signal/parking lights 212. Headlights 202, taillights/turn signal lights 204, and turn signal/parking lights 212 may be associated with the signaling system 166. Light bar 207 may also be associated with the signaling system 166.

Vehicle 100 also includes sensors of the perception system 172. For example, housing 214 may include one or more laser devices for having 260 degree or narrower fields of view and one or more camera devices. Housings 216 and 218 may include, for example, one or more radar and/or sonar devices. The devices of the perception system 172 may also be incorporated into the typical vehicle components, such as taillights/turn signal lights 204 and/or side view mirrors 208. Each of these radar, camera, and lasers devices may be associated with processing components which process data from these devices as part of the perception system 172 and provide sensor data to the computing devices 110.

The computing devices 110 may control the direction and speed of the vehicle by controlling various components. By way of example, computing devices 110 may navigate the vehicle to a destination location completely autonomously using data from the detailed map information, perception system 172, and routing system 168. In order to maneuver the vehicle, computing devices 110 may cause the vehicle to accelerate (e.g., by increasing fuel or other energy provided to the power system 174 by acceleration system 162), decelerate (e.g., by decreasing the fuel supplied to the power system 174, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between a power system 174 of the vehicle and the wheels of the vehicle. Again, by controlling these systems, computing devices 110 may also control the drivetrain of the vehicle in order to maneuver the vehicle autonomously.

The perception system 172 and/or computing devices 110 may use prior observations of the object to predict a future trajectory of the object. For instance, an object's speed, orientation/heading, location, state (i.e. turn signal, etc.) may be used to predict a series of locations and times in the future where the object is likely to be. Together, these locations and times may form a trajectory for the object for some brief period into the future.

As discussed further below, the perception system 172 may also provide a bounding box representing the location of sensor data points corresponding to an object. In addition, the perception system may provide information identifying all of the points within and, in some cases, also any points within an area around that bounding box.

The data 134 may include a database, table or other organization system that relates bounding box sizes or dimensions to expected wheel locations. For example, different bounding boxes may accommodate objects of different sizes which may have wheels located at different relative positions. For example, for a size of a side given bounding box, as an example, 8 feet by 5 feet, the expected wheel location may be measured from a corner of the bounding box corresponding to the front end of the object and have a predetermined size, as an example 2 feet 4 inches back from the corner. In some cases, the expected wheel locations may be further delineated by specific object types, such as, for instance, whether the object is bus, truck, passenger car, motorcycle, bicycle etc. These actual dimensions may be based on actual observed wheel locations on different size and/or types of objects.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

The computing devices 110 may initiate the necessary systems to control the vehicle autonomously along a route to the destination location. For instance, the routing system 168 may use the map information of data 134 to determine a path or route to the destination location that follows a set of the lane segments of map information. The computing devices 110 may then maneuver the vehicle autonomously (or in an autonomous driving mode) as described above along the route towards the destination.

In order to follow the route, the computing devices 110 may periodically determine a trajectory for the vehicle. For example, using the route as a baseline, the computing devices may generate a set of future locations of the vehicle in order to both follow the route using the detailed map information and avoid close interaction with other road users, such as pedestrians, bicyclists, and pedestrians. These future locations may be used by the computing devices to guide the steering, acceleration and/or deceleration of the vehicle in order to follow the route.

Figure 3:
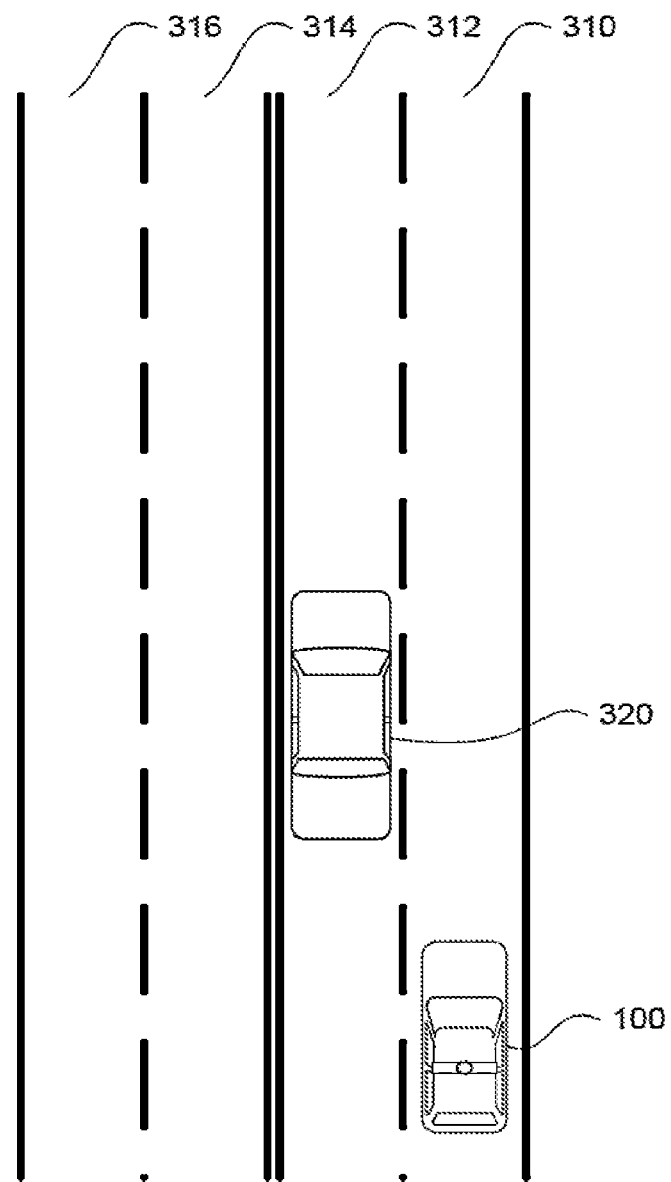
FIG. 3 is a view of a roadway and vehicles in accordance with aspects of the disclosure.

For instance, FIG. 3 is an example view of vehicle 100 being maneuvered by the computing devices 110 along a roadway 300. In this example, roadway includes northbound lanes 310, 312 and southbound lanes 314, 316. Vehicle 100 is traveling in the northbound lane 310 and is approaching another vehicle 320. Vehicle 320 is traveling in the northbound lane 312.

Figure 4:
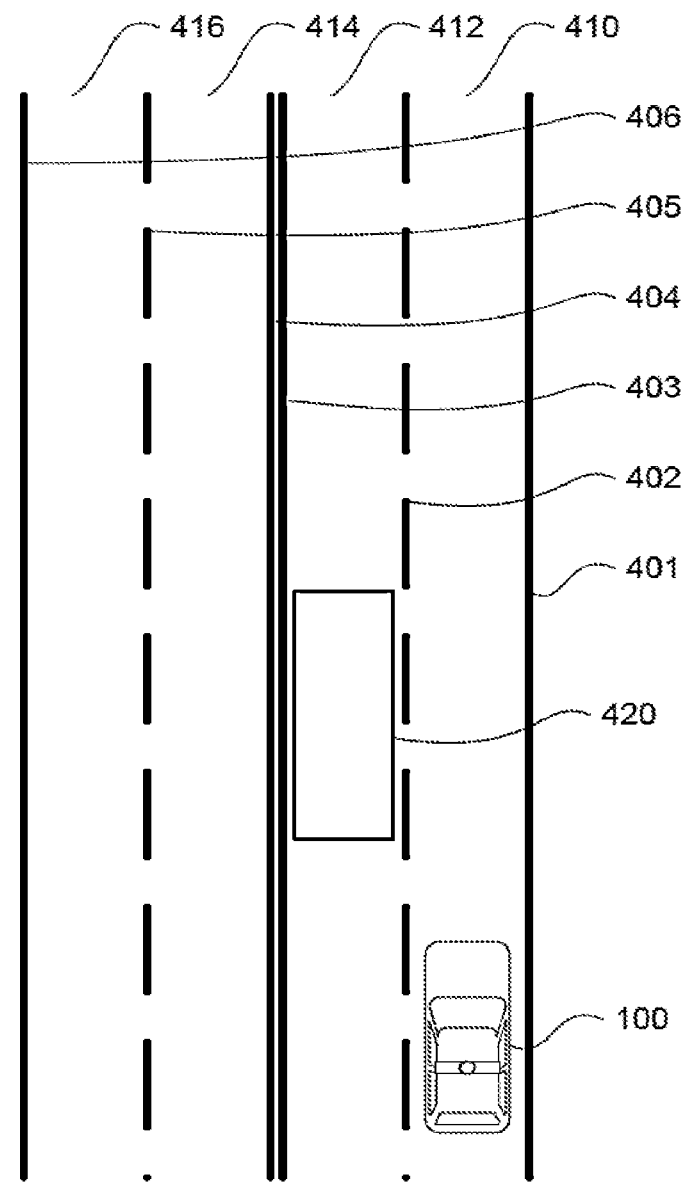
FIG. 4 is a view of a data and a vehicle in accordance with aspects of the disclosure.

As the vehicle 100 is traveling, the sensors of the perception system 172 may detect various objects in the vehicle's environment. FIG. 4 is a representation of objects detected by the perception system 172 along roadway 400 and the position of vehicle 100 corresponding to the view of roadway 300 in FIG. 3. In this example, the perception system 172 may detect lanes lines 401, 402, 403, 404, 405, and 406 which define lanes 410, 412, 414, and 416. In this example, lanes 410, 412, 414, and 416 may correspond to each of northbound lanes 310 and 312 and southbound lanes 314 and 316, respectively. In addition, perception system 172 has also detected vehicle 320.

Figure 5B:
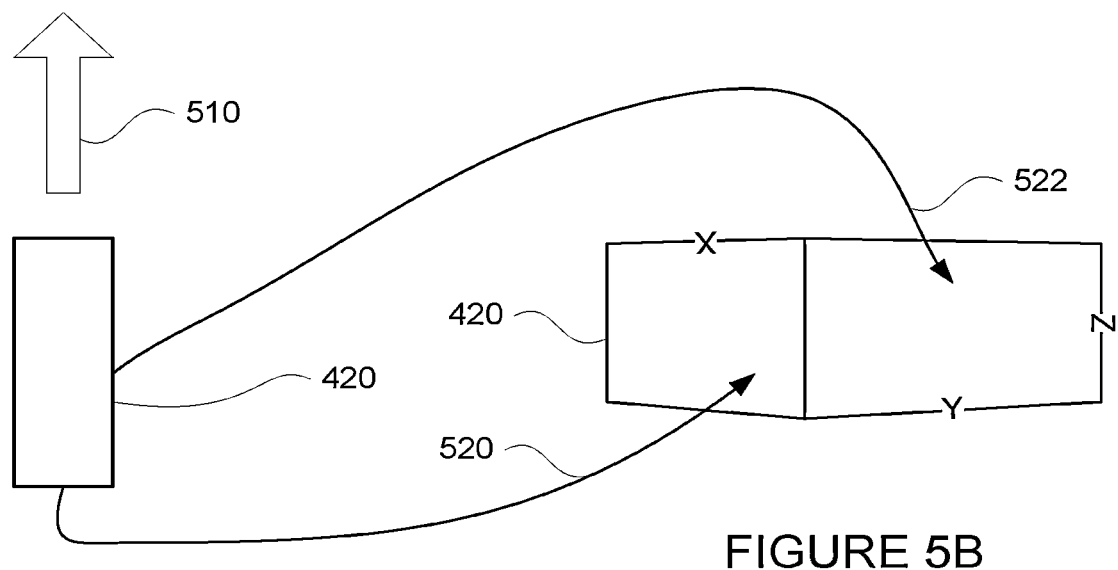
FIGS. 5A and 5B are example views of a bounding box in accordance with the disclosure.
Figure 5A:
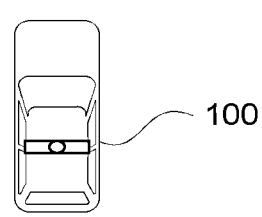

For each object, the vehicle's perception system may use segmentation to identify specific sensor data points corresponding to an object. This may also include determining a bounding box representing the dimensions of that object. This may be achieved using any known segmentation and/or bounding box techniques. For instance, as shown in FIG. 4, the location of vehicle 320 is represented by bounding box 420 which includes data points that the perception system 172 has determined to correspond to an object. FIG. 5A depicts a top down view of the relative positions of vehicle 100 and bounding box 420 as shown in FIG. 4. Arrow 510 represents the current or observed heading of vehicle 320 and therefore the heading of bounding box 420. FIG. 5B depicts a side view of the bounding box 420. Arrows 520 and 522 identify the corresponding sides of the bounding box 420 of FIGS. 5A and 5B. The distances X, Y, and Z represent the width, length and height of the bounding box 420.

The characteristics of the identified objects as well as the segmentation information identifying the sensor data points (and in some cases, bounding boxes) for those objects may be provided to the computing devices 110 by the perception system 172. As an example, these characteristics may include the location (GPS coordinates and/or relative to the vehicle), size, shape, dimensions, speed, orientation, elevation, type (passenger vehicle, tractor trailer, bicycle, pedestrian), features of the road surface (lane lines, etc.), and more. In addition, the perception system may provide information identifying sensor data points around the object, but not specifically associated with the object according to the segmentation.

The perception system and/or the vehicle's computing devices may use prior observations of the object to predict a future trajectory of the object. For instance, an object's speed, orientation/heading, location, state (i.e. turn signal, etc.), or prior estimated trajectory may be used to predict a series of locations and times in the future where the object is likely to be. Together, these locations and times may form a trajectory for the object for some brief period into the future. With regard to the examples of FIGS. 3 and 4, the perception system 172 may predict that the vehicle 320 or the object of bounding box 420 may continue traveling north following northbound lane 312 or lane 412 based on the object's prior history of traveling in northbound lane 312 or lane 412.

When the characteristics of an object are determined to correspond to an object that has a wheel, for instance because it is located in a lane and is of at least a particular size, has a particular shape, is moving at a particular speed, is of a particular type, etc., the computing devices may attempt to estimate a location of a wheel of the object. Again, this determination may be made by the computing devices 110 on the basis of the characteristics received from the perception system 172.

Using the dimensions of the bounding box and/or the size of the object, the vehicle's computing devices may estimate an area corresponding to a location of a wheel of the object. In order to estimate location of a wheel (front or rear) of an object, the vehicle's computing system may access the expected wheel locations of data 134 and identify an expected wheel location corresponding to the dimensions (X, Y, and Z) of the bounding box 420. An expected wheel location may correspond to a 2D area such as a disc or a 3D volume such as a cylinder with a height corresponding to a width of a wheel located at some distance relative to a particular corner of the bounding box. So given the dimensions of the bounding box, the computing devices 110 may identify an area (2D or 3D) of the bounding box where a wheel of the object (vehicle 320) is likely to be located.

In addition to the dimensions of the bounding box, other characteristics from the perception system 172 may be used to identifying an expected wheel location from the data 134. As an example, if the bounding box 420 is identified as corresponding to a passenger car, the expected wheel location identified from the data 134 may be different from a situation in which the bounding box 420 is identified as corresponding to a bus or bicycle.

Figure 6A:
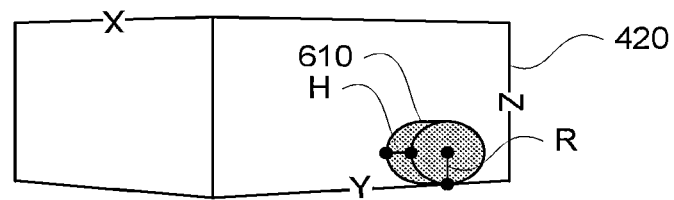
FIGS. 6A and 6B are example views of a bounding box and an area corresponding to an estimated location of a wheel in accordance with the disclosure.
Figure 6B:
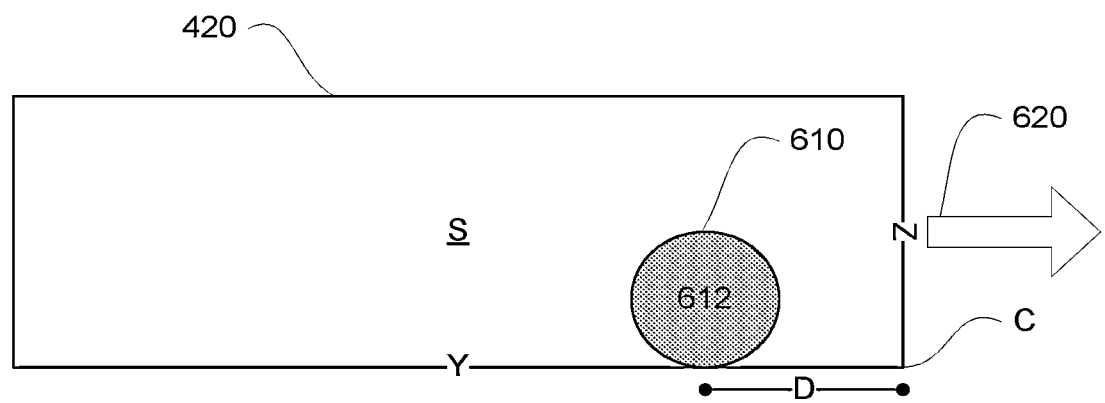

As shown in, FIGS. 6A and 6B, area 610, which represents an expected wheel location for a front wheel of bounding box 420, is a cylinder. One circular end surface 612 of the cylinder is located at or a short distance, such as 2 or 3 inches or more or less, outside of surface S of the bounding box (the side of the bounding box to which the location of wheel would correspond as shown in FIG. 6B). In this regard, other data points representing objects or surfaces which may have been intentionally or unintentionally excluded from the bounding box 420, but which are still within a short distance of the bounding box, for instance, 2 or 3 inches or more or less, may also be included in the analysis in order to avoid missing points which could still correspond to a wheel.

Again, in this example, arrow 620 represents the heading of the bounding box 420 and thus corresponds to arrow 510 of FIG. 5. In this example, the area may be identified as being a cylinder of radius R and height H, located at a distance D from corner C corresponding to a corner of the bounding box visible to the perception system 172 and closest to the front of the vehicle according to the heading of the vehicle. As an example only, for a small passenger vehicle R may be 12.25 inches, H may be 7.3 inches, and D may be 32.413 inches.

Using the example of the front wheel, generally, unless the object is heading towards the vehicle's sensors, only one front wheel will be visible to the sensors, so the location of this front wheel relative to the bounding box can be estimated based on a combination of the heading of the object (for instance from the past trajectory of the object) and the expected wheel locations (identified using the size of the bounding box and/or dimensions of the object). In other words, arrow 620 (corresponding to arrow 510), representing the heading of the bounding box 420 (as determined from a past trajectory of the object), can be used to identify the front of the vehicle, assuming that vehicles typically travel forwards.

Figure 7:
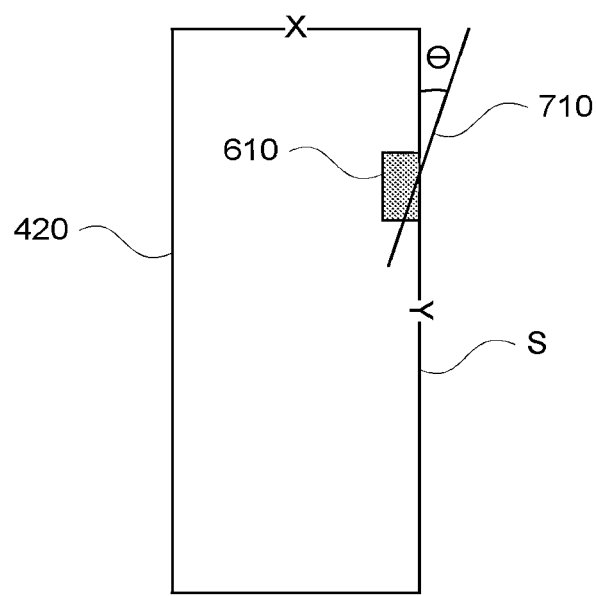
FIG. 7 is an example of a bounding box, an area corresponding to an estimated location of a wheel, and an estimated plane in accordance with the disclosure.

The data points within the area may then be analyzed to identify an average orientation of the points in the area. For instance, the data points may be fit to a plane using a simple plane fitting algorithm. FIG. 7 is a top down view of the bounding box 420 depicting the area 610. In this example, the points within area 610 are fit to plane 710. The angular difference between plane 710 and the plane of the surface S of the bounding box, or angle Θ, may be estimated to be an orientation of the front wheel of the object of bounding box 420, here vehicle 320.

The object's past trajectory can also be used to get an idea or estimate of the orientation of the front wheel. For instance, the object's past heading could be used as a seed (a start angle) when fitting the data points to the plane. Alternatively, the past trajectory could be used alone to determine the orientation of the vehicle's wheel.

Of course, the number of data points within the area will depend upon the relative positions, distance and angle between the object's front wheel and the vehicle's sensors. In that regard, the closer the object is to the vehicle and the more perpendicular the wheel is to the vehicle's sensors, the more sensor data points are likely to be received from wheel surface and the more accurate the estimation may be.

The estimation may be used as an indication of the curvature of the future path of the vehicle (the change in orientation over distance) or yaw rate (the change in orientation over time). For example, combining the future wheel orientation with the object's speed, a trajectory of the object can be determined. In this regard, the estimation may be used to determine a future heading for an object, a future trajectory for an object, or alternatively, increase or decrease a likelihood or confidence in different future trajectories for an object.

Figure 8:
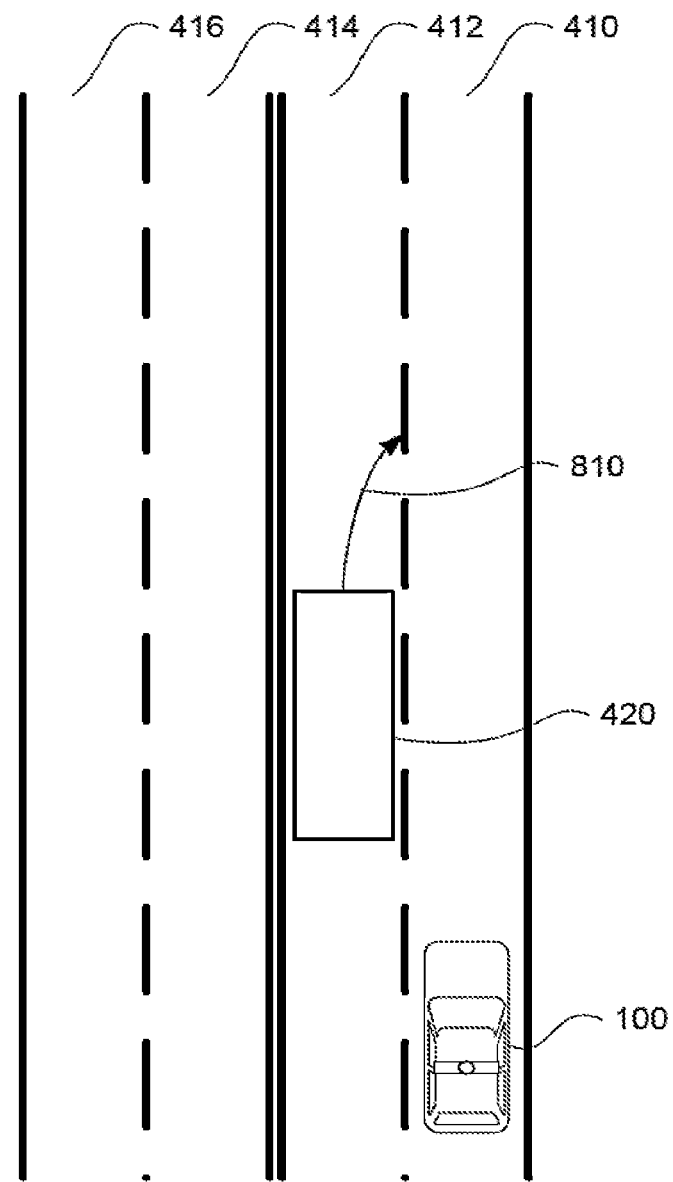
FIG. 8 is another view of a data and a vehicle in accordance with aspects of the disclosure.

The predicted heading or trajectory may then be used to make driving decisions for the vehicle. For instance, when the object is in an adjacent lane, the predicted heading may be a very early indication that the object is going to move towards the vehicle's lane. As an example, turning to FIG. 8, where the angle Θ is relatively large, such as 15 degrees or more or less, this may indicate a future heading or future trajectory 810 of the bounding box 420 which takes the object (vehicle 320) towards the northbound lane 410. In this example, the future trajectory (heading and speed over a future period of time) of the bounding box may indicate that the object will enter into lane 410 within a predetermined period of time, for instance 1 second or more or less. In response, the vehicle's computing devices may control the vehicle to speed up, slow down, or even change lanes as appropriate to avoid a collision or even getting too close to vehicle 320. In extreme cases, such as where the object appears to be changing headings erratically, the vehicle's computing devices may even notify a passenger of the vehicle to take control of the steering, braking, or acceleration if possible. Alternatively, if the vehicle is being controlled in a semi-autonomous or manual mode, the notification may be provided in order to assist the driver of the vehicle.

Alternatively, the area may be determined by using a model of wheel locations. In this regard, the size, location, and shape of the bounding box as well as the locations of the data points, may be used to fit a model which provides the orientation of the wheel using a simple fixed wheel radius for the wheel or more complex wheel radius that depends upon the size of the bounding box. In this example, the model may be trained using machine learning where operators mark and identify data points corresponding to wheels as positive examples for training data for the model.

The features described above may relate to laser data points which provide distance, direction and intensity information. In this regard, the intensity information may be used as a cue to indicate the outer rim of the wheel (i.e. a black wheel would have low reflectivity and therefore low intensity). In this regard, the area may be estimated using one or more images of the object and thereafter, the laser data may be used to identify the orientation of the wheel.

Similarly, if the perception system provides camera data, the location of a black object above the road surface and proximate to the location of the bounding box may be used as a cue to indicate a location of a wheel. In some cases, an image alone may be sufficient to recognize a possible wheel location and even estimate an orientation of a vehicle's wheel, for instance, using a 3D model estimation from two or more images of the wheel and/or 3D model data generated for the image using laser data. Another way to compute wheel orientation from an image may include determining the aspect ratio of wheel width and height in the image. This aspect ratio may correspond to a wheel orientation. Combining this with the orientation of the object, as determined from other sensor data, image processing of the image or multiple images of the wheel, the relative wheel orientation can be computed.

Estimating the wheel orientation can even be useful for very slow moving and even stopped vehicles. For instance, an object that is ready to move out of a parking spot may have angled the object's wheels to move out of the parking spot, but may not actually have begun moving. Thus, using the angle of the wheel to estimate a future trajectory of an object is more likely to predict accurately the object's trajectory as otherwise, the computing devices would likely predict that the object would remain stationary. In another example, a given vehicle is stopped in an adjacent lane may attempting to change into the lane of the vehicle 100, for instance, because the driver of that car has changed his mind and wants to change his route and use the lane. In such cases, the wide angle of the wheel relative to the side of the given vehicle may provide more information about where the given vehicle is going to go than the given vehicle's prior trajectory. Such stationary lane changes or low-speed lane changes are common cases where the front wheels are angled significantly.

Figure 9:
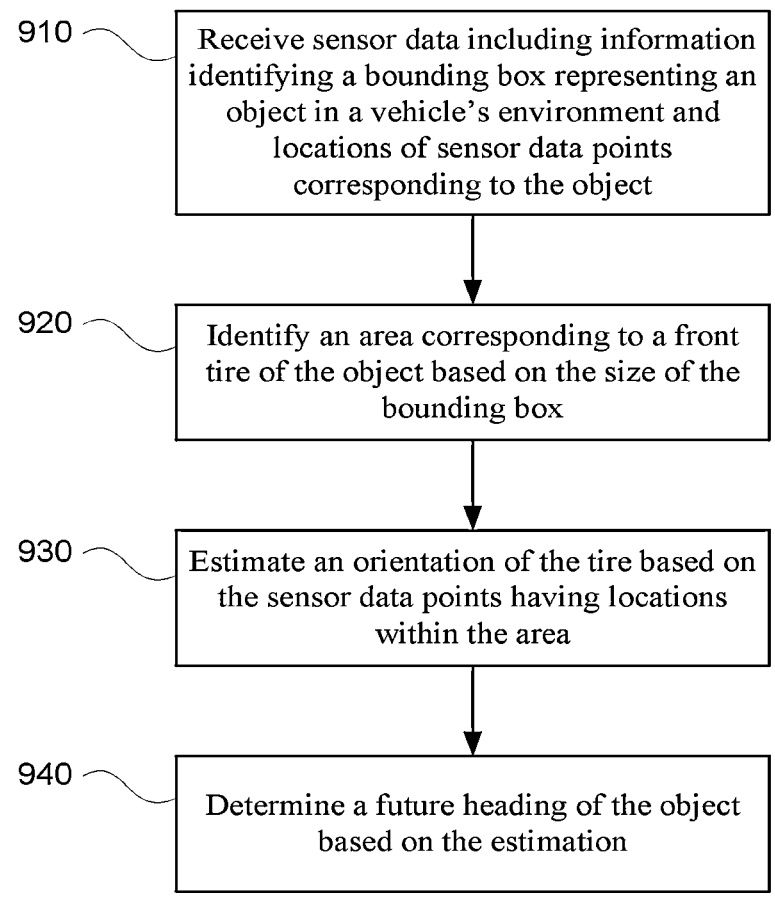
FIG. 9 is a flow diagram in accordance with aspects of the disclosure.

FIG. 9 is an example flow diagram 900 in accordance which may be performed by one or more processors of one or more computing devices of a vehicle, such as computing devices 110 of vehicle 100 in order to determine a future heading of an object. In this example, sensor data, including information identifying a bounding box representing an object in a vehicle's environment and locations of sensor data points corresponding to the object, is received at block 910. An area corresponding to a front wheel of the object based on the size of the bounding box is identified at block 920. An orientation of the wheel is determined based on the sensor data points having locations within the area at block 930. A future heading of the object is determined based on the estimation at block 940.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
receiving, by one or more processors of an autonomous vehicle, sensor data including information identifying an object in an environment of the autonomous vehicle and sensor data corresponding to the object;
analyzing, by the one or more processors, sensor data points of an area corresponding to an expected location of a front wheel of the object in order to estimate an angle corresponding to an orientation of the front wheel of the object; and
controlling, by the one or more processors, the autonomous vehicle based on the orientation.

2. The method of claim 1, further comprising:
storing, by the one or more processors, data in a memory of the autonomous vehicle, the data relating different bounding box dimensions to expected wheel locations.

3. The method of claim 2, further comprising:
receiving, by the one or more processors from a perception system of the autonomous vehicle, a bounding box representing dimensions of a location of the sensor data points corresponding to the object, and one or more characteristics of the object.

4. The method of claim 3, further comprising:
estimating, by the one or more processors, a location of the front wheel of the object by (1) identifying one of the expected wheel locations that corresponds to dimensions of the bounding box received from the perception system, and (2) identifying an area of the bounding box where the front wheel is likely to be located.

5. The method of claim 1, wherein the sensor data includes laser sensor data points.

6. The method of claim 1, wherein the sensor data includes a camera image.

7. The method of claim 1, further comprising:
identifying, by the one or more processors, a portion of the sensor data that is within the area by using a three-dimensional model estimation from two or more images of the front wheel.

8. The method of claim 1, further comprising:
identifying, by the one or more processors, a portion of the sensor data that is within the area by using three-dimensional model data generated for a camera image.

9. The method of claim 1, wherein a type of the object includes one of a passenger vehicle, a tractor trailer, a bus or a bicycle.

10. The method of claim 1, wherein the expected location of the front wheel corresponds to a two-dimensional area.

11. An autonomous vehicle comprising:
one or more processors configured to:
receive sensor data including information identifying an object in an environment of the autonomous vehicle and sensor data corresponding to the object;
analyze sensor data points of an area corresponding to an expected location of a front wheel of the object in order to estimate an angle corresponding to an orientation of the front wheel of the object; and
control the autonomous vehicle based on the orientation.

12. The autonomous vehicle of claim 11, further comprising a memory, wherein the one or more processors are further configured to store data in the memory, the data relating different bounding box dimensions to expected wheel locations.

13. The autonomous vehicle of claim 12, further comprising a perception system, wherein the one or more processors are further configured to receive from the perception system a bounding box representing dimensions of a location of sensor data points corresponding to the object, and one or more characteristics of the object.

14. The autonomous vehicle of claim 13, wherein the one or more processors are further configured to estimate a location of the front wheel of the object by (1) identifying one of the expected wheel locations that corresponds to dimensions of the bounding box received from the perception system, and (2) identifying an area of the bounding box where the front wheel is likely to be located.

15. The autonomous vehicle of claim 11, wherein the sensor data includes laser sensor data points.

16. The autonomous vehicle of claim 11, wherein the sensor data includes a camera image.

17. The autonomous vehicle of claim 11, wherein the one or more processors are further configured to identify a portion of the sensor data that is within the area by using a three-dimensional model estimation from two or more images of the front wheel.

18. The autonomous vehicle of claim 11, wherein the one or more processors are further configured to identify a portion of the sensor data that is within the area by using three-dimensional model data generated for a camera image.

19. The autonomous vehicle of claim 11, wherein a type of the object includes one of a passenger vehicle, a tractor trailer, a bus or a bicycle.

20. The autonomous vehicle of claim 11, wherein the expected location of the front wheel corresponds to a two-dimensional area.

* * * * *